United States Patent [19]

Gernhardt et al.

[11] Patent Number: 5,568,344
[45] Date of Patent: Oct. 22, 1996

[54] IN-LINE CORD GROUND FAULT CIRCUIT INTERRUPTER

[75] Inventors: Paul Gernhardt, Northport; David Chan, Bellerose; Serge Krzyzanowski, Flushing, all of N.Y.

[73] Assignee: Leviton Manufacturing Co., Inc., Little Neck, N.Y.

[21] Appl. No.: 333,531

[22] Filed: Nov. 2, 1994

[51] Int. Cl.$^6$ ........................................................ H02H 3/16
[52] U.S. Cl. .................................. 361/42; 361/45; 361/115
[58] Field of Search .................................. 361/42, 45, 115

[56] References Cited

U.S. PATENT DOCUMENTS

| | | | |
|---|---|---|---|
| Re. 30,678 | 7/1981 | Van Zeeland et al. | 361/44 |
| 3,213,321 | 10/1965 | Dalziel | 317/18 |
| 3,448,580 | 4/1969 | Molengar | 335/18 |
| 3,506,906 | 4/1970 | Nestor | 321/18 |
| 3,539,867 | 11/1970 | Edmunds | 317/18 |
| 3,566,189 | 2/1971 | Wilson et al. | 317/18 |
| 3,611,035 | 10/1971 | Douglas | 317/18 D |
| 4,000,444 | 12/1976 | Douglas et al. | 317/18 D |
| 4,001,647 | 1/1977 | Klein | 361/42 |
| 5,198,955 | 3/1993 | Willner | 361/42 |

*Primary Examiner*—Howard L. Williams
*Assistant Examiner*—Stephen W. Jackson
*Attorney, Agent, or Firm*—Paul J. Sutton

[57] ABSTRACT

An in-line cord ground fault circuit interrupter which contains within a common housing the sensing unit and the tripping relay usually found separately packaged at a remote location. The fixed contacts are mounted on fixed contact arms mounted adjacent one surface of a printed circuit board with the movable contacts mounted on movable contact arms mounted adjacent the second surface. The tripping relay operates an armature between an open and a closed condition and by cams on the arms of the armature opens and closes the movable contacts with the fixed contacts. The two portion housing allows the components of the interrupter to be mounted on one portion of the housing which also supports the line and load conductors making assembly of the rear housing portion to the front housing portion easy.

13 Claims, 9 Drawing Sheets

IN-LINE CORD GROUND FAULT CIRCUIT INTERRUPTER

RELATED APPLICATIONS

1. Serial No.: 08/012,511
   Filed: February 16, 1993
   For: In-Line Cord Ground Fault Circuit Interrupter
   Inventors: Paul Gernhardt, et al.
   Assignee: Leviton Manufacturing Co., Inc.
2. Serial No.: 08/090,684
   Filed: September 21, 1993
   For: In-Line Cord Ground Fault Circuit Interrupter
   Inventor(s): Paul Gernhardt, et al.
   Assignee: Leviton Manufacturing Co., Inc.

BACKGROUND OF THE INVENTION

1. Field of the Invention

This invention relates to a self-contained ground fault circuit interrupters and more particularly to a ground fault circuit interrupter that can be placed mid-span between supply line conductors and load conductors and which contains within a single housing the devices and circuitry necessary for detecting a fault and a tripping relay responsive to the detection of a fault to open its contacts and terminate the flow of current to a load.

2. Description of the Prior Art

There has been a great need for means for detecting when an abnormal current is flowing through line to ground and for immediately interrupting the fault to halt such an abnormal flow to protect people from electric shock, fire, and explosion. As known in the prior art, the "differential" circuit breakers previously utilized in certain European countries have been generally unsatisfactory for such purposes because they have been too insensitive to ensure complete protection to human life. The prior art attempts to solve the aforementioned problem by providing a differential circuit breaker whose current interrupting contacts, in the event of a line to ground short circuit or an abnormal leakage current to ground, are operated by a semiconductor device which in turn is energized by the secondary of a differential transformer through whose core two conductors of the electrical circuit being monitored pass to effectively function as primary windings for the differential transformer.

Known is a ground fault circuit interrupter with an inadvertent ground sensor wherein a circuit breaker connected between a power source having a neutral conductor and a phase conductor and a load is operated when the differential transformer senses that more current is flowing into the load from the source through the conductors than is flowing back to the source through the conductors. A power transformer is connected across the neutral conductor and a phase conductor and has in its magnetic field a winding for inducing a small voltage between the neutral conductor and ground to sense an inadvertent grounding of the neutral conductor at or near the load. A tertiary winding of the power transformer is connected into the neutral conductor in the vicinity of the load whereby, in the event of a grounding of the neutral conductor in the vicinity of the load, a current is thus induced in the neutral conductor which passes into the ground in the vicinity of the load, and then into the ground for the neutral connector at the power line side of the differential transformer whereupon it passes through the primary of the differential transformer and, if large enough, causes the circuit breaker to open.

Also known is a ground fault protective system comprising a differential transformer having a toroidal core through which each of two line conductors and a neutral conductor pass to form primary windings of at least one turn. The secondary winding of the transformer serves as an output winding and is connected to a ground fault interrupter circuit which energizes the trip coil of a circuit breaker having a plurality of contacts connected to the conductors of the distribution circuit. The protective system further includes pulse generator means coupled to the neutral conductor for producing a high frequency current therein upon grounding of the neutral conductor between the differential transformer and the load. The high frequency current is produced by the periodic firing of a diac when the voltage on a capacitor connected thereto reaches a certain level. Thus, a continuous train of voltage pulses is applied to a winding of an output transformer and these pulses induce voltage pulses in the neutral conductor which passes through the transformer core. The voltage pulses induced on the neutral conductor have no effect upon the current balance in the distribution system as long as the neutral conductor is not grounded on the load side of the transformer. When such grounding does occur, the voltage pulses produce a current in the neutral conductor which does not appear in either of the line conductors. This imbalance is detected by the ground fault sensing means and causes the contacts to open, interrupting the flow of current in the distribution system.

Another known arrangement discloses an electrical circuit breaker including highly sensitive ground fault responsive means for protecting human life from electrical shock. Reference is made to the fact that prior art electric circuit breakers were not suitable for protecting human life which protection requires the detection of fault currents on the order of 3 to 50 milliamperes with load currents ranging on the order of 10 to 100 amperes. Sensitivity adequate to protect against ground faults is achieved by a circuit breaker comprising highly sensitive ground fault responsive means including a differential transformer having a toroidal core fabricated of a magnetic material. A line conductor and a neutral conductor pass through the opening in the toroidal core, forming single turn primary windings. The differential transformer also includes a secondary winding comprising a plurality of turns wound on the toroidal core. This secondary winding is connected to the remainder of the ground fault responsive means which includes a solenoid assembly comprising an armature, an operating coil, and a frame mounted on a casing. The armature is adapted for movement between an extended position and a retracted position in response to energization of the operating coil. A latch hook is attached to the armature and disposed for engaging the armature member of the actuator assembly. Thus, energization of the operating coil causes the latch hook to draw the armature away from a latch member to initiate tripping of the circuit breaker. The highly sensitive ground fault responsive means of this arrangement comprising the aforementioned solenoid assembly is capable of opening the circuit breaker contacts in response to ground fault current on the order of 3 to 5 amperes, and thus is desirable from the standpoint of protecting human life against electrical shock.

Yet another ground fault circuit interrupter comprises a differential transformer connected to an AC source which produces a voltage output when an imbalance in current flow between the power lines connected to the AC source occurs. This AC signal voltage is coupled to a differential amplifier through a coupling capacitor, rectified, current limited, and applied to a gate of an SCR. When the SCR conducts, the winding of a transformer connector across the power line is energized, causing two circuit breaker switches to open. Also provided is a ground fault circuit for closing the switch when the line becomes unbalanced.

Still another known arrangement uses a ground leakage protector including a ground fault release coil controlled by a ground fault detector. The ground fault release coil is normally energized, and is deenergized when a ground fault appears which disables a restraining latch which results in the opening of the circuit breaker.

Yet another known arrangement uses a unitary circuit breaker of the molded case type including, within its casing means sensitive to ground faults, means sensitive to overcurrents, and means sensitive to short circuit currents, all of which act on a common trip latch of the breaker to cause automatic opening. The ground fault sensitive means comprises a current imbalance detecting coil which energized a tripping solenoid, releasing a normally latched plunger to cause tripping.

Also known is a ground fault protection system that employs a dormant oscillator which is triggered into oscillation to initiate disconnection of the protected distribution circuit upon occurrence of a neutral to ground type of fault.

None of the aforementioned prior art suggests a tripping relay which is not self-contained but rather is mounted in a circuit interrupter.

SUMMARY OF THE INVENTION

A housing made up of a front member and a rear member, which when joined, provides an environmental seal about the components of the ground fault circuit interrupter. Apertures at a first end admits the line conductors from an AC source and at the second end admit the load conductors. A series of ribs and bosses with threaded apertures on the interior of the front member permit the various components to be positioned, supported anchored to such member. Ribs in the interior of the rear cover bear upon some of the components in the front cover to further insure that such components remain in place.

The components of the ground fault circuit interrupter are mounted upon a printed circuit board which also supports the movable and fixed contacts which make or break conductive paths from the AC source to the load. The front member further contains a tripping relay which in response to a signal indicating detection of a ground fault opens the conductive paths and interrupts current flow to a load. It is an object of the present invention to provide an improved ground fault circuit interrupter.

It is another object of the present invention to provide a ground fault circuit interrupter which can be positioned in the conductors between a power source and a load.

It is yet another object of the present invention to provide a ground fault circuit interrupter where both the ground fault detection circuitry and the current interrupting relay and contacts are contained in a single housing.

It is still another object of the present invention to provide a printed circuit board on which is placed the ground fault detection circuitry and to which is attached the fixed contacts and movable contacts controlled by a relay in response to signals or the absence of signals from the ground fault detection circuiting.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWINGS

In the drawings in which similar elements are given similar reference characters.

DESCRIPTION OF THE PREFERRED EMBODIMENT

Turning now to FIGS. 1 to 8 and 8A, there is shown an in-line and ground fault current interrupter or GFCI10 constructed in accordance with the concepts of the invention. The GFCI10 has a housing 12 consisting of a front housing member 55 having a cavity 13 therein and a rear housing member 98 containing a cavity 99 which when assembled to each other with the GFCI components in cavities 13 and 99 provide an environmental seal about such components. Semi-circular recesses 60 and 62 in front housing member 55 and semi-circular recesses 104 and 106 in rear housing member 98, when members 55 and 98 are assembled form cord gripping passageways into the cavities 13 and 99 of housing 12. A plastic or rubber cord grip and strain relief device 22 molded about or otherwise placed about the line conductors which extend from an AC power supply (not shown) is seated in the aperture defined by recesses 60 and 104. A similar cord grip 24 is placed about the load conductors which extend from GFCI10 to the load (not shown). Cord grip 24 is engaged by the aperture defined by recesses 62 and 106.

Figure 1:
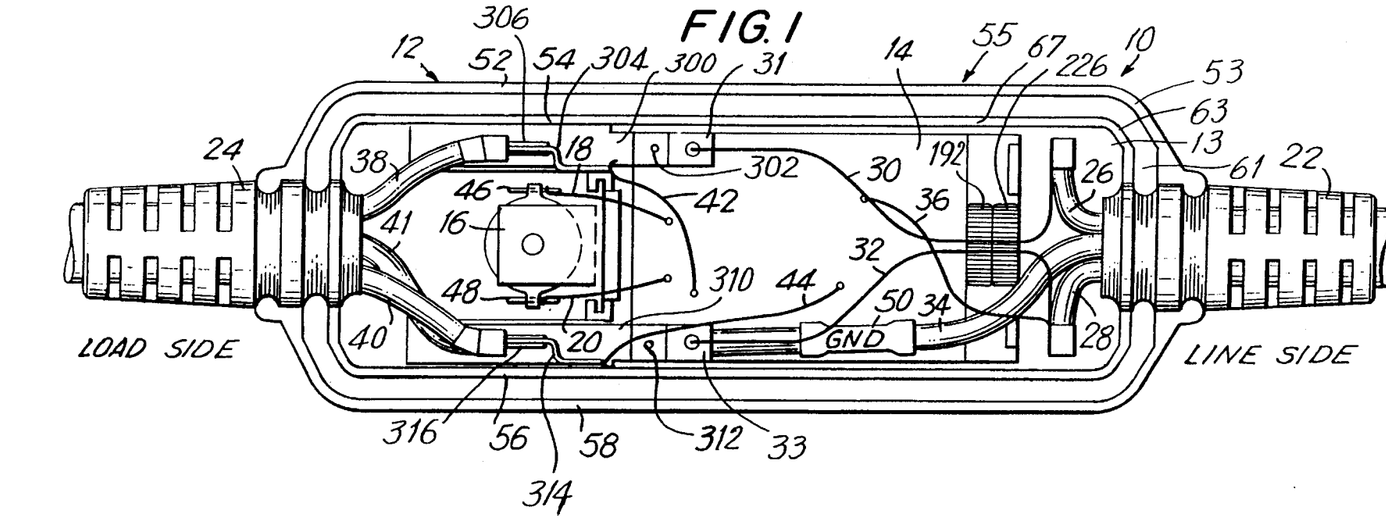
FIG. 1 is a top plan view of the interior of the front housing member of an in-line cord ground fault circuit interrupter constructed in accordance with the concepts of the invention showing the placement of the major components of such interrupter.

The line side conductors consist of a hot or phase or line conductor 26, a neutral conductor 28 and a ground conductor 34. The load side conductors consist of a hot or phase or line conductor 38, a neutral conductor 40 and a ground conductor 41. A printed circuit board 14 is mounted in the cavity 13 of front housing member 55 and is connected by additional conductors to the line side and load side conductors. Line phase conductor 26 is connected by a further conductor 30 to a terminal 31 connected to the line side movable contact arm, as will be described below. Conductor 30 passes through the transformers 192 and 226. A conductor 32 which passes through transformers 192 and 226, joins neutral line conductor 28 to a terminal 33 connected to neutral side movable contact arm, as will be described below. Line ground conductor 34 is connected load ground conductor 41 by a connector within the marking sleeve 50 which carries the legend GND for ground. The neutral line conductor 28 is also coupled by conductor 36 to a terminal of printed circuit board 14.

The load phase conductor 38 is connected to the terminal 304 of fixed phase contact 300 by means of a slip-on connector 306. The load neutral conductor 40 is connected to the terminal 314 of fixed neutral contact 310 by means of a slip-on connector 316. Terminal 304 is also connected by conductor 42 to a terminal of the printed circuit board 14 and terminal 314 is similarly connected to a printed circuit board 14 terminal by conductor 44.

Mounted between fixed contacts 300 and 310 is a relay 16 having coil terminal 46 connected by conductor 18 to the printed circuit board 14 while coil terminal 48 is connected to the printed circuit board 14 by conductor 20.

Figure 2:
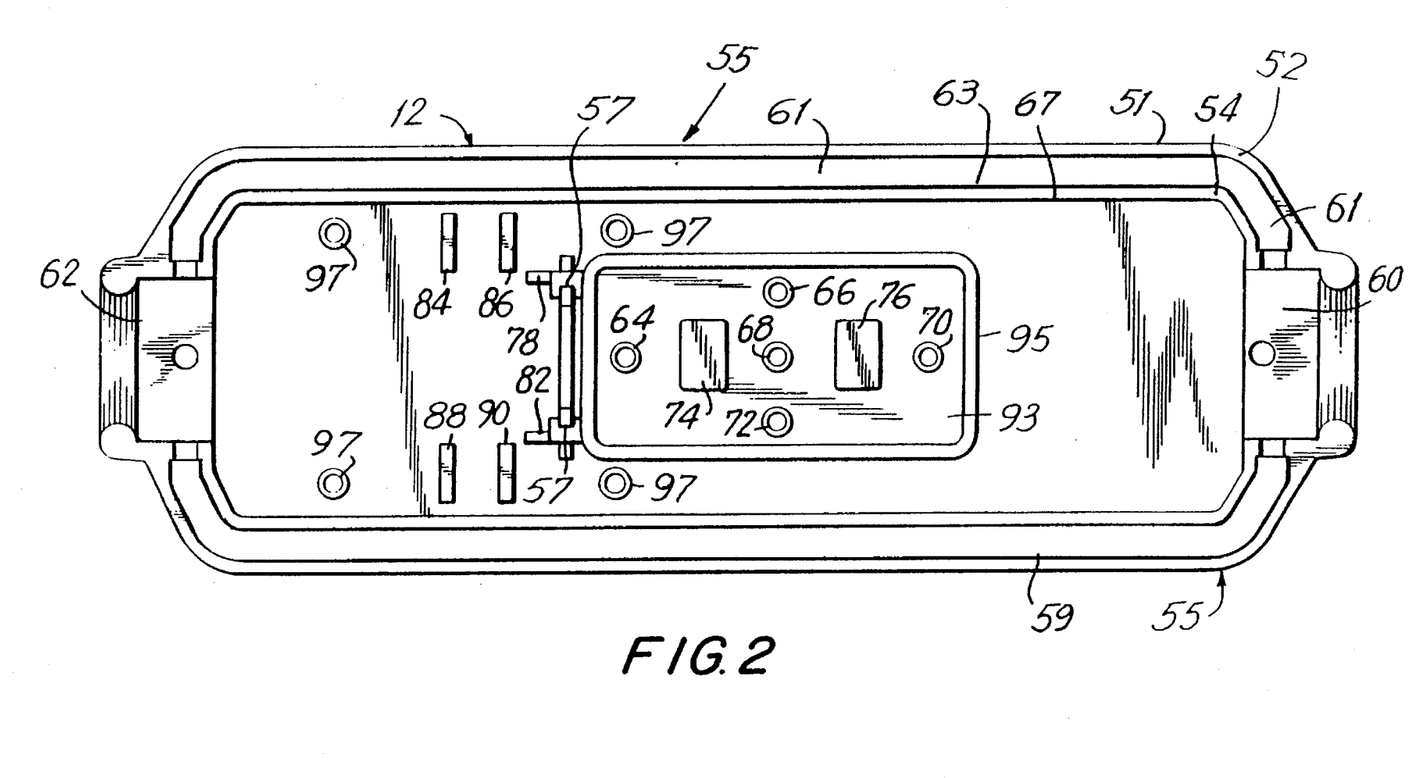
FIG. 2 is a top plan view of the interior of the front housing member of FIG. 1 with the components removed to show various positioning, support and mounting ribs and threaded bosses and such front housing member.

Formed along the outermost edge 51 of front housing member 55 is a raised rib 52 having a flat top surface. Formed along the outermost edge 67 of cavity 13 is a raised rib 54 with a flat top surface. Between edge 63 of rib 54 and edge 53 of rib 52 is a flat surface 61. These surfaces and ribs will mate with complementary surfaces and ribs on the rear housing member 98 as set forth below.

Formed adjacent outer edge 330 of rear housing member 98 (see FIG. 4) is a flat region 332 which will mate with raised rib 52 of front housing member 55. A raised rib 338 of a resilient material such as natural or synthetic rubber, plastic, an elastomeric or the like is placed in the center of raised region 336 of rear housing member 98 and will be engaged by region 61 of front housing member 55. The rib 338 will be compressed to provide a further environmental seal for housing 12. A further recess 340 between the inner boundary 342 of raised rib 336 and the inner edge 344 of cavity 99 receives raised rib 52 of front housing member 55. Thus there exists a triple seal between front housing member 55 and rear housing member 98 to prevent the intrusion of dirt, moisture or other debris into housing 12 which could prevent proper operation of the GFCI10.

Figure 3:
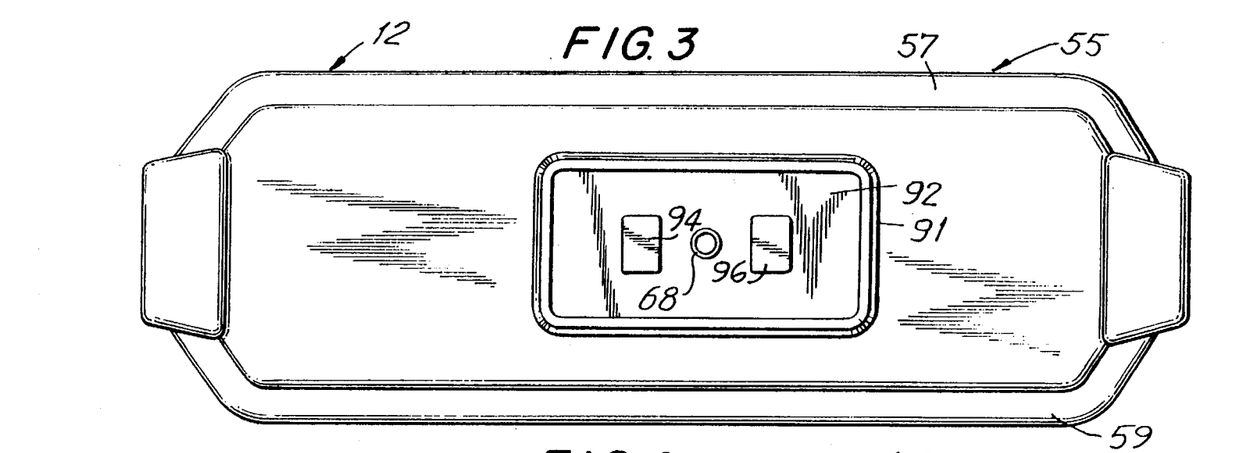
FIG. 3 is a top plan view of the exterior of the front housing member shown in FIGS. 1 and 2.

FIG. 3 shows a front view of the front housing member 55. In the center of member 55 is a low wall 91 which separates the control button panel 92 from the remainder of front housing member 55. Mounted in panel 92 is a test button 94 by which the operation of GFCI10 can be verified and tested and a reset button 96 which can reset the relay 16 after the GFCI10 has operated. An aperture 68 is provided so that a screw (not shown) can be used to fasten front housing member 55 to the components within housing 12. The outer edge of member 55 is rounded as at 59.

Figure 4:
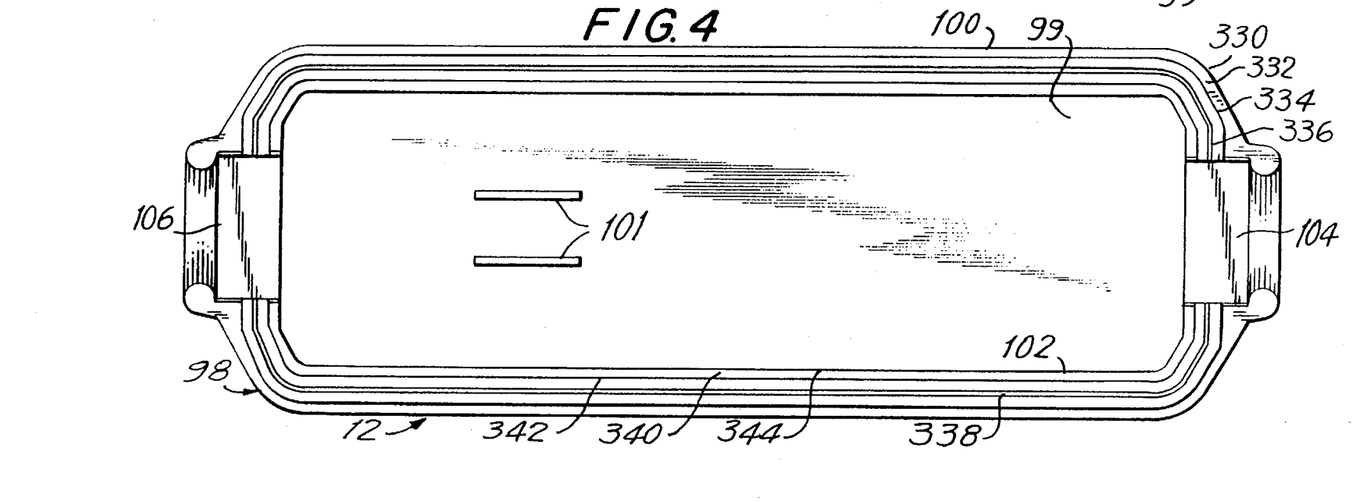
FIG. 4 is a top plan view of the interior of the rear housing member which together with the front housing member forms the complete enclosure for the in-line cord ground fault circuit interrupter.
Figure 5:
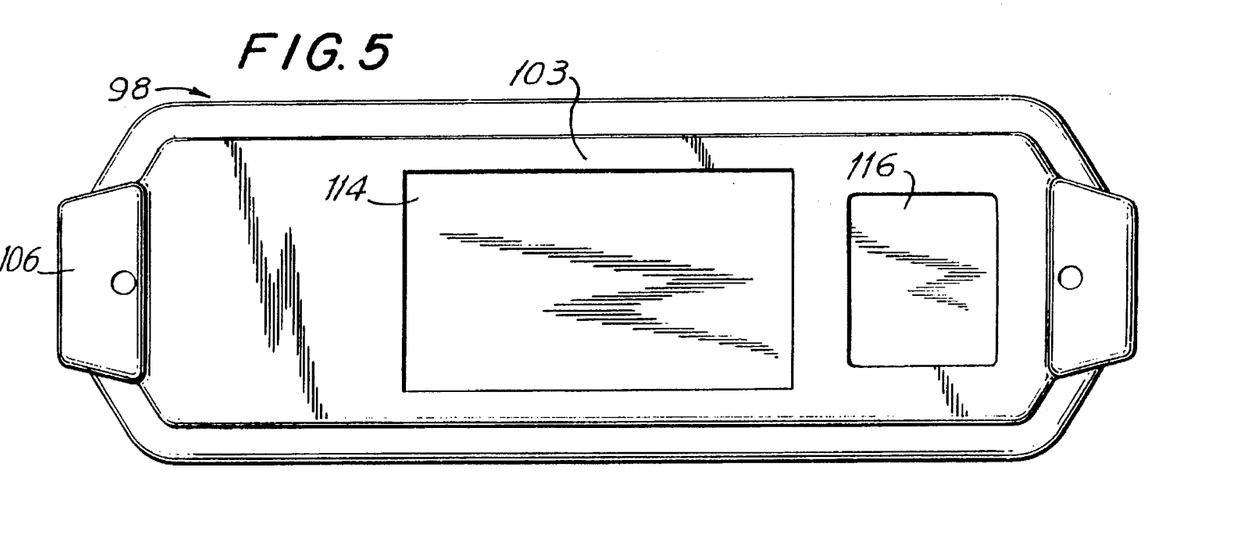
FIG. 5 is a top plan view of the exterior of the rear housing member of FIG. 4.

Turning now to FIG. 2 the interior of front housing member 55 is shown without the various components mounted thereon as shown in FIG. 1. The back side 93 of panel 92 also has a low wall 95 about it. In panel 93 are apertures 74 and 76 which receive the test button 94 and reset button 96 respectively. Positioned on panel 93 within wall 95 are bosses 64, 66, 70 and 72 which have bores therein to permit the receipt of appropriate fasteners (not shown) to anchor the test button 94 and the reset button 96 (not shown). Other bosses 97 and support ribs 78, 82, 84, 86, 88 and 90 are provided to anchor and support the various components. Similar support ribs 101 are placed within cavity 99 of rear housing member 98, as shown in FIG. 4. In addition the rear face 103 of rear housing member 98 has two recesses 114 and 116 to receive labels 115 and 117, respectively, or the like (see FIGS. 5 and 8).

Figure 8:
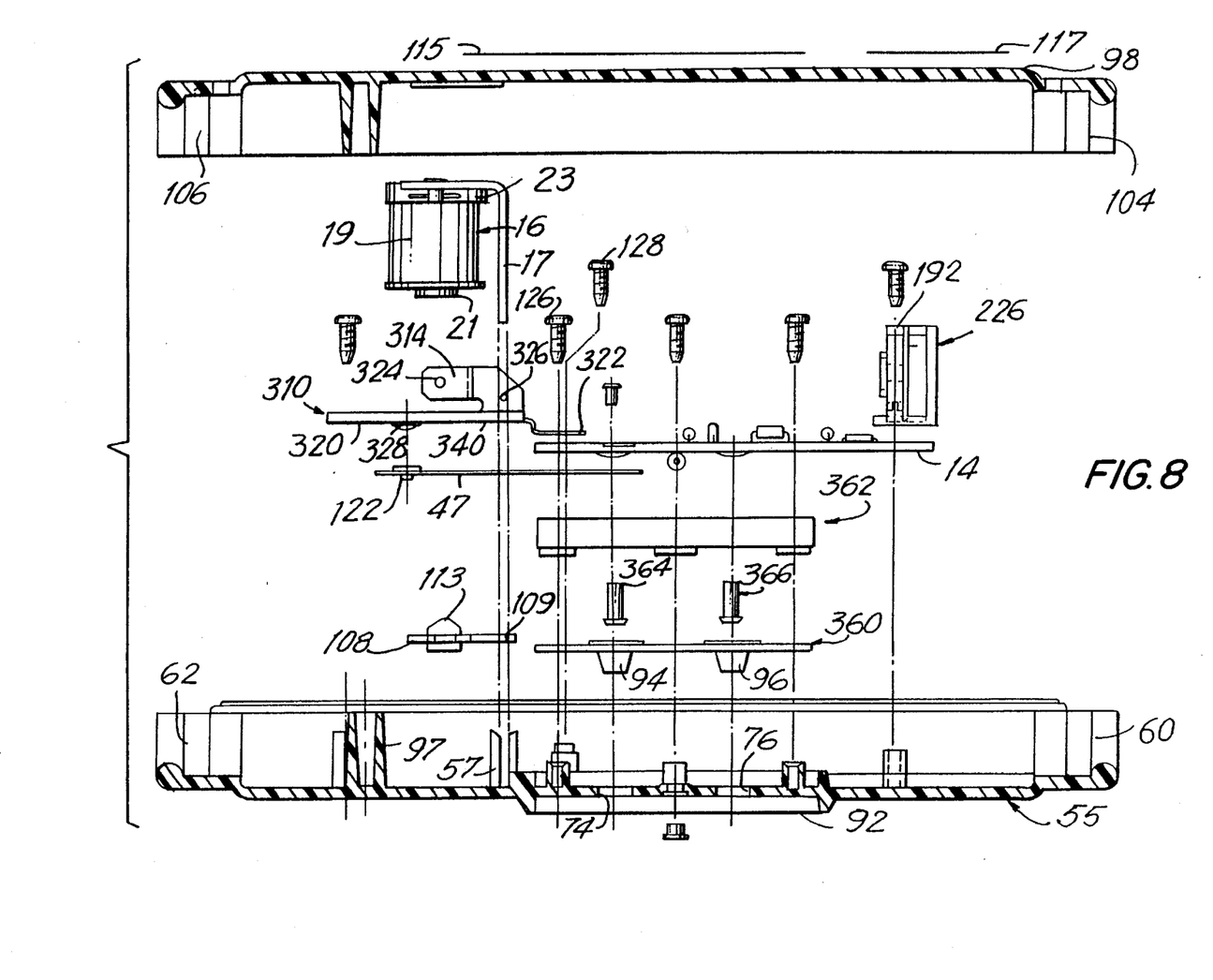
FIG. 8 is an exploded side elevational view of an in-line cord ground fault circuit interrupter constructed in accordance with the concepts of the invention.
Figure 8A:
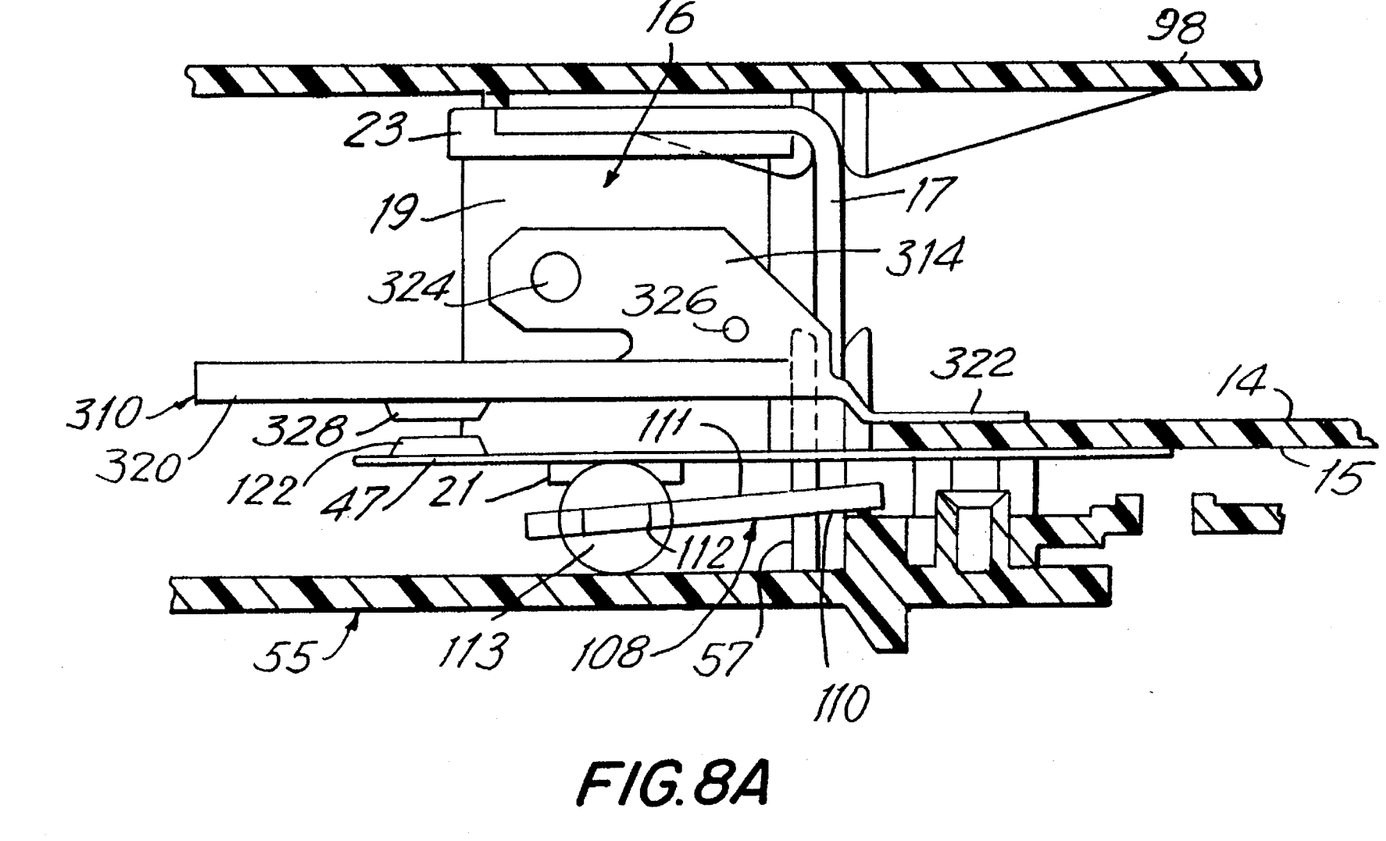
FIG. 8A is an enlarged side elevational view, partly in section, of the relay, armature, fixed and movable contacts of the device of FIG. 8.

Turning now to FIGS. 8 and 8A the various components of the GFCI10 are shown. Into the cavity 13 of front housing member 55 is placed button support 360 which supports test button 94 and reset button 96 so that test button 94 extends through aperture 74 and reset button 96 extends through aperture 76. A support 362 extends over support 360 to space and support printed circuit board 14. Studs 364 and 366, respectively, connect test button 94 and reset button 96 to printed circuit board 14.

Figure 7:
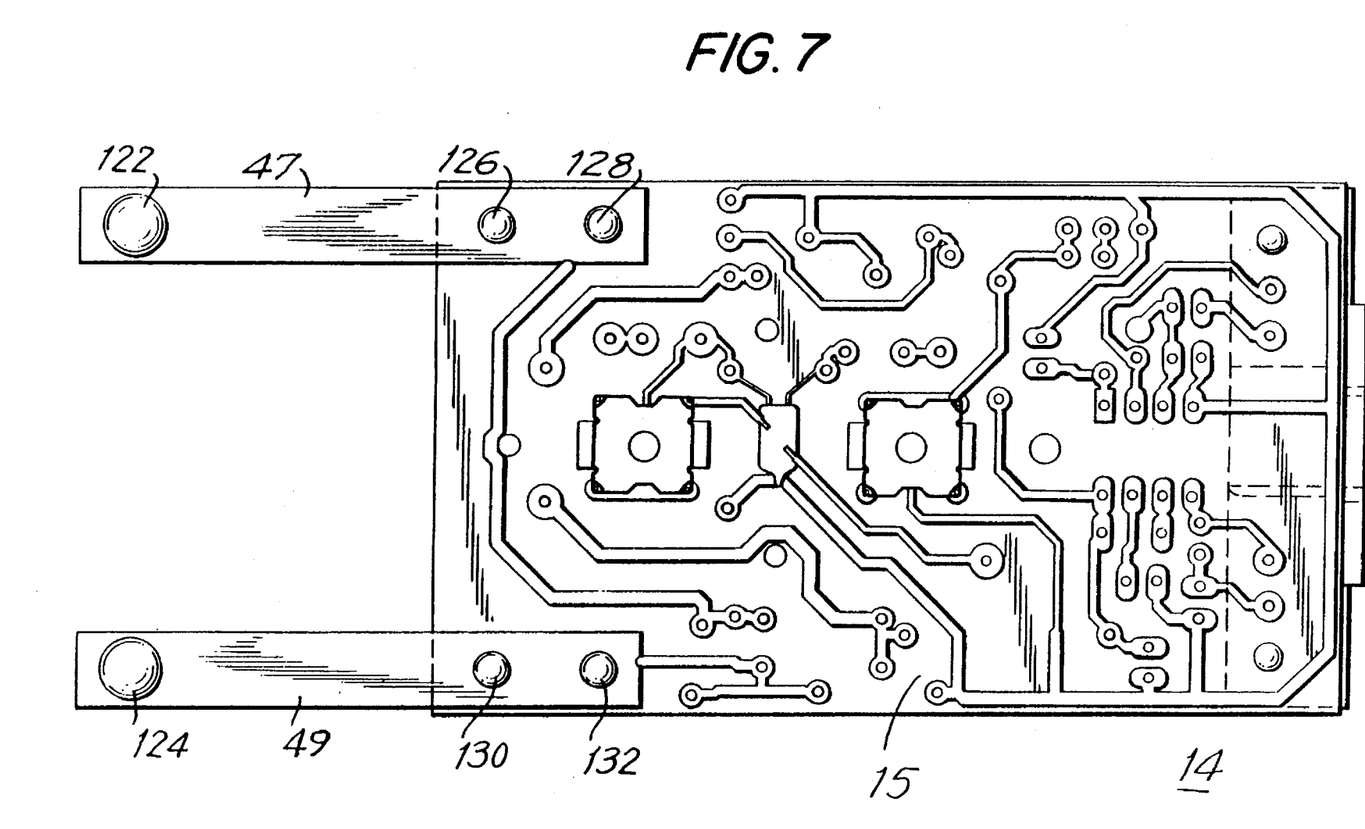
FIG. 7 is a bottom plan view of the printed circuit board of the device of FIG. 1.

FIG. 7 shows the underside 15 of printed circuit board 14. Underside 15 faces the front housing member 55. Mounted directly to side 15 of printed circuit board 14 are movable contact arms 47 and 49. Movable contact arm 47 is anchored to the printed circuit board 14 by fasteners 126 and 128. Fastener 128 is in turn electrically connected to terminal 31. Movable contact arm 49 is anchored by fasteners 130 and 132, the latter being electrically connected to terminal 33. Contact arm 47 has movable contact 122 mounted thereon and movable contact arm 49 has movable contact 124 thereon.

Returning to FIGS. 8 and 8A, the fixed contact 310 is shown. Fixed contact 310 has a body 320 with a mounting tail 322. The fastener 126 can also be used to anchor body 320 by passing through a suitable aperture in tail 322 (not shown). The tail 322 must be insulated from fastener 126 as by pad 312 to prevent a short to contact arm 47. Pad 302 serves the same purpose for contact 300. Terminal 314 is formed at right angles to body 320 and is arranged to receive a slip-on connector (not shown) attached to the load phase conductor 38. Alternatively, aperture 324 in terminal 314 could also have a conductor inserted therein and soldered, welded or braised to terminal 314. An aperture 326 receives one end of conductor 44 which can be soldered, welded, braised or otherwise attached. Finally, fixed contact 310 has a fixed contact 328 which can engage the contact 122 of movable contact arm 47.

A second fixed contact (not shown) can be attached to the opposite end of the printed circuit board 14 to provide a fixed contact to be engaged by movable contact 124 on movable contact arm 49. The fixed contacts are not connected to one another electrically or mechanically but are mounted upon a common base, the printed circuit board 14 and are intended to be made to contact movable contacts 122 and 124 at the same time as will be described below.

Figure 6:
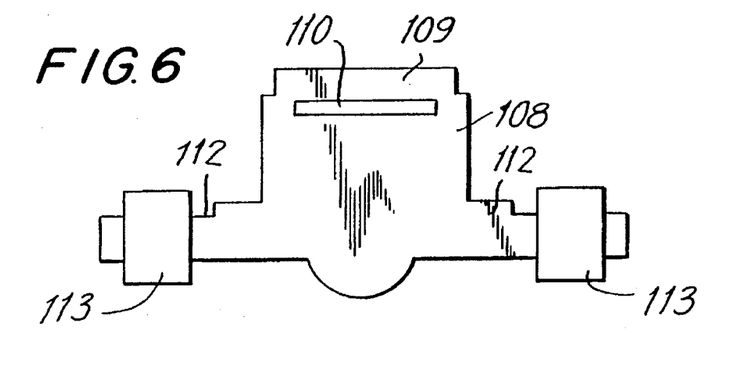
FIG. 6 is a top plan view of the armature of the device of FIG. 1.

The device for operating the movable contacts 122 and 124 via their movable contact arms 47 and 49 is the armature 108 shown in FIG. 6. Armature 108 has a body 109 with a slot 110 near a first end and outwardly extending arms 112 at its opposite end. Adjacent the ends of the arms 112 is placed an insulated cam 113. The relay mounting bracket 17 goes through slot 110 into mounting bosses 57 in the cavity 13 of front housing member 55. The armature 108 is free to rotate about the relay mounting bracket 17 from the position shown in FIG. 8A to one where the contacts 122 and 328 are closed. The insulated cams 113 are positioned on arms 112 in such positions the one cam 113 is below movable contact arm 47 and the other is below movable contact arm 49. The body 109 of armature 108 is supported on the ribs 78 and 82. When operated from the position shown in FIG. 8A to the opposite operating position, the phase or line or hot load and supply lines will be closed and the neutral load and supply lines will be closed by the engagement of movable contact 122 with fixed contact 328 and movable contact 124 with a corresponding fixed contact on fixed contact 300.

The position of the armature 108 is controlled by relay 16. Relay 16 has a core about which a coil 19 is wound and from which a pole piece 21 projects. A frame 23 about the coil 19 protects it and provides a place to attach the relay mounting bracket 17. The relay 16 is positioned between the fixed contacts 300 and 310 and between the movable contact arms 47 and 49 with the pole piece 21 adjacent the body 109 of armature 108 between the cams 113. With no operating current applied to coil terminals 46, 48, no magnetic field is created adjacent the pole piece 21 and the armature 108 is moved to the open position shown in FIG. 8A by the compression spring 111. When operating current is applied via coil terminals 46, 48 to coil 19, a field is set up adjacent pole piece 21 which draws armature 108 from its position in FIG. 8A to the position where armature 108 is in direct contact with pole piece 21. In this state, cams 113 will move movable contacts 122, 124 into engagement with contacts 328. This will close the circuit between the AC source and the load.

After a ground fault indication has caused the circuit contacts between the supply and load to open, the contacts can be closed merely by depressing the reset button 96. If the fault is still present the circuit will again open.

To be sure the system is operational the test button 94 is depressed to simulate a ground fault condition. After the contacts open in response to the created fault they can be reclosed by operating the reset button 96.

Figure 9:
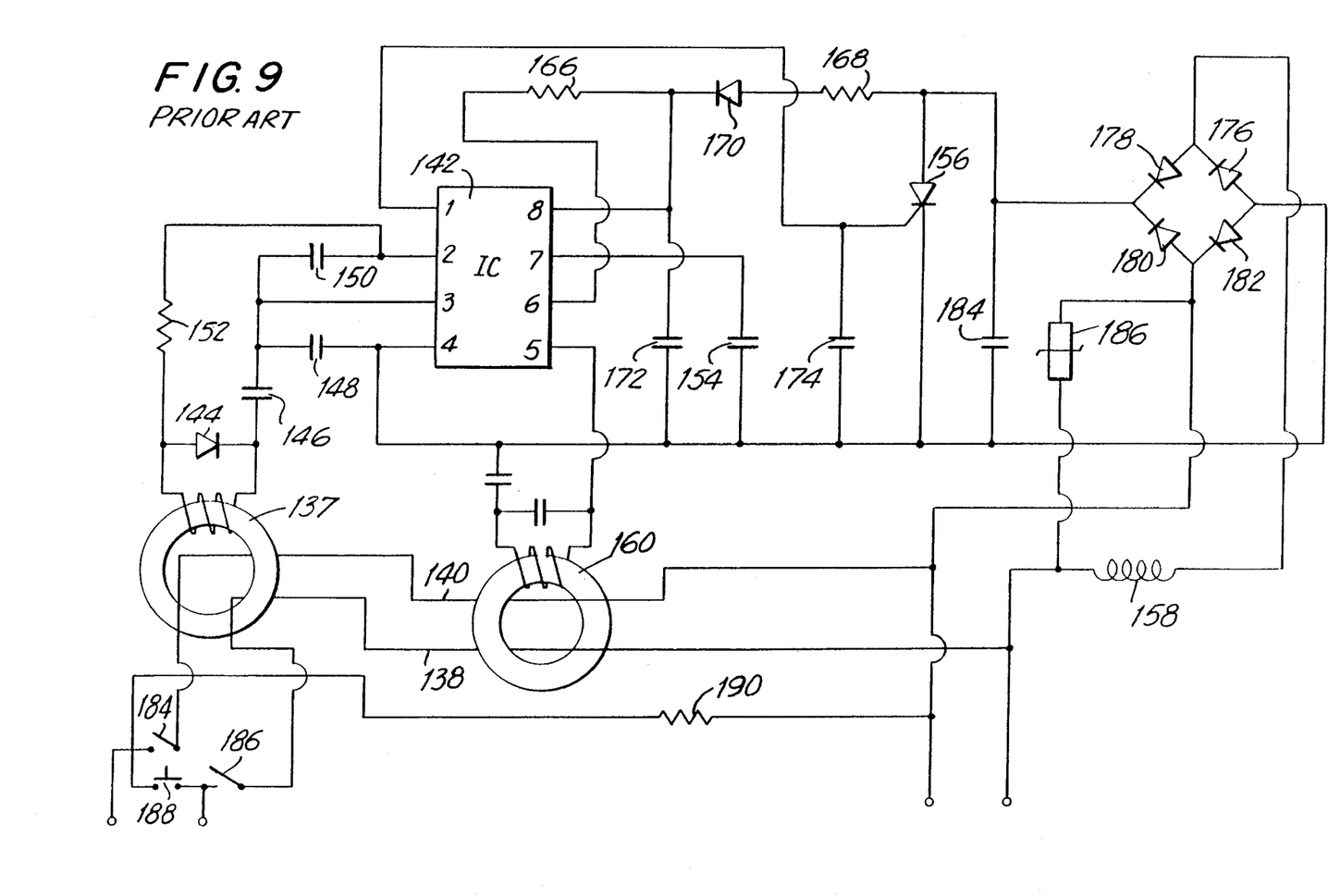
FIG. 9 is a schematic drawing of the circuitry of a prior art ground fault circuit interrupter.

FIG. 9 describes a prior art GFCI circuit. This circuit operates in the following manner:

Differential transformer 137 monitors the flow of current in the line and neutral conductors and produces in its secondary a fault signal when the total current in the line conductor or conductors 138 does not equal the current in the neutral conductor 140. The output from the secondary of differential transformer 137 is conveyed to integrated circuit 142 through diode 144, capacitors 146, 148 and 150, and resistor 152. Integrated circuit 142 may be a type NL 1851 Ground Fault Interrupter manufactured by National Semiconductor Corporation.

A salient feature of the above circuit is the combination of diode 144 and resistor 152 which are arranged so as to promote quick discharge of capacitor 146. This discharge of capacitor 146 allows for integrated circuit 142 to be kept continuously energized and thus considerably reduces the time required for detection of a fault. This continuous energization of integrated circuit 142 from the line side was not possible in the earlier arrangements wherein power to the integrated circuit has to be brought from the load side or an auxiliary switch had to be employed so that the integrated circuit could only function intermittently. The reason for this is that capacitor 154, which is attached to output pin 7 of integrated circuit 142, and which basically controls the trip circuit, would otherwise cause SCR 156 to fire frequently, thus frequently energizing trip coil 158 and causing the possibility of trip coil burnout.

On a neutral to ground fault the system functions somewhat similarly in that transformer 160, which together with differential transformer 137 forms part of the induction coil, has a signal induced on its secondary windings which is carried through capacitors 146 and 148 to input pin 4 of integrated circuit 142.

The trip circuit for both types of faults is identical in that, if a fault is detected by the input pins 2, 3, and 4 of IC 142, a signal is output from pin 7 of integrated circuit 142 causing capacitor 154 to charge faster. At the same time, the path to the gate of SCR 156 including resistors 166 and 168, diode 170, and capacitors 172 and 174, is energized. SCR 156 then conducts and an energization path to trip coil 158 is created through the diode bridge containing diodes 176, 178, 180 and 182. Capacitor 184 and MOV 186 are present for surge protection.

Upon energization of trip coil 158 due to a line to ground fault, contacts 186 and 184 of the ground fault circuit interrupter are opened which respectively open lines 138 and 140.

A push-button 188 and resistor 190 are part of a test circuit which bypasses the transformers 137 and 160. Also, since the ground fault circuit interrupter is only sensitive to differences in current flow between the "hot" conductors and the neutral conductor or the neutral conductor and ground, unbalanced loading between "hot" conductors will not cause "nuisance" tripping.

Figure 10:
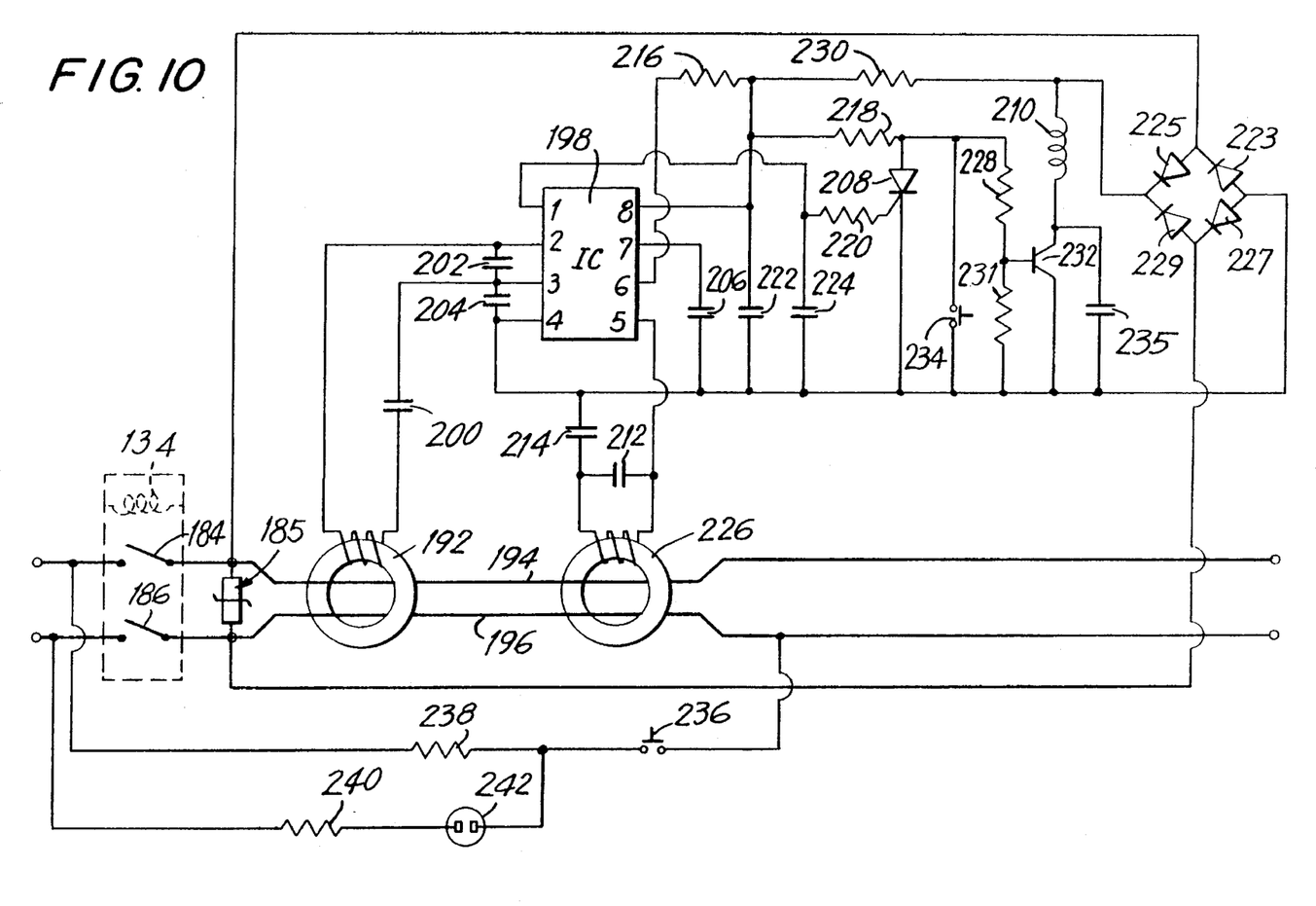
FIG. 10 is a schematic drawing of the circuitry of the ground fault circuit interrupter of the present invention.

FIG. 10 is a schematic of the ground fault circuit interrupter of the present invention. The operation of this circuit is somewhat similar to that shown in FIG. 9. As shown therein, differential transformer 192 monitors the flow of current in the line and neutral conductors and produces in its secondary a fault signal when the total current in the line conductor or conductors 194 does not equal the current in the neutral conductor 196.

The output from the secondary of differential transformer 192 is conveyed to integrated circuit 198 through capacitors 200, 202, and 204. Integrated circuit 198 may be a type of ground fault interrupter "chip" manufactured by a number of companies. The circuit is arranged so that quick discharge of capacitor 200 is promoted, thus allowing for integrated circuit 198 to be kept continuously energized and consequently reducing the time required for detection of a fault. This continuous energization of integrated circuit 198 from the line side was not possible in some earlier arrangements wherein power to the integrated circuit had to be brought from the load side or an auxiliary switch had to be brought from the load side or an auxiliary switch had to be employed so that the integrated circuit could only function intermittently. The problem with this intermittent function would be that capacitor 206, which is attached to output 7 of integrated circuit 198, and which basically controls the trip circuit, would otherwise cause SCR 208 to fire frequently, thus frequently energizing trip coil 210 and causing the possibility of trip coil burn out.

On a neutral to ground fault the system functions somewhat similarly in that transformer 226, which together with differential transformer 192 forms part of an induction coil, has a signal induced on its secondary windings which is carried through capacitors 212 and 214 to input pin 4 of integrated circuit 198.

The trip circuit for both types of faults is identical in that, if a fault is detected by the input pins 2, 3, and 4 of IC 198, a signal is output from pin 7 of integrated circuit 198 causing capacitor 206 to charge faster. At the same time the path to the gate of SCR 208 including resistors 216, 218, 220, and 230, as well as capacitors 222 and 224, is energized.

SCR 208 then conducts and sends a signal through resistors 228 and 231 to the base of transistor 232 which then conducts along an energization path to trip coil 210 including capacitor 235 and diode bridge 223,225, 227, and 229. Metal oxide varistor 185 provides a voltage input to the diode bridge.

As to the trip circuit, when trip coil 210 is energized, a signal is sent to relay coil 134 which then uses its contacts 184 and 186 to open lines 194 and 196.

A reset push-button 234 is also provided. A test circuit which bypasses transformer 192 and 226 comprises tent push-button 236, resistors 238 and 240 and neon light 242. Also, since the ground fault circuit interrupter is only sensitive to differences in current flow between the hot conductors and the neutral conductor or the neutral conductor and ground, unbalanced loading between "hot" conductors will not cause "nuisance" tripping.

The embodiments of the invention disclosed and described in the present specification and drawings and claims are presented merely as examples of the invention. Other embodiments, forms and modifications thereof will suggest themselves from a reading thereof and are contemplated as coming within the scope of the present invention.

We claim:

1. An in-line cord ground fault circuit interrupter comprising:

a) a first housing portion having an outer surface and an inner surface, a first end and a second end and first cavity therebetween:

b) a first semi-circular electrical cord entrance at said first end and a second semi-circular cord entrance at said second end;

c) a second housing portion having an outer surface and an inner surface, a third end and a fourth end and a second cavity therebetween.

d) a third semi-circular electrical cord entrance at said third end and a fourth semi-circular cord entrance at said fourth end;

e) component mounting means on said inner surface of said first housing portion;

f) component support means on said inner surface of said second housing portion;

g) a printed circuit board having a front side and a rear side mounted adjacent said inner surface of said first housing portion using said component mounting means;

h) at least one fixed contact arm mounted upon said rear side of said printed circuit board;

i) at least one fixed contact, one for each of said at least one fixed contact arm, coupled to its associated one of said at least one fixed contact arm;

j) at least one movable contact arm mounted upon said front side of said printed circuit board;

k) at least one movable contact, one for each of said at least one movable contact arm, coupled to its associated one of said at least one movable contact arm;

l) a selectively positionable operating means mounted upon said rear side of said printed circuit board and having a first position where said at least one movable contact on said at least one movable contact arm engages said at least one fixed contact on its associated at least one fixed contact arm and a second position where said at least one movable contact on said at least one movable contact arm is separated from said at least one fixed contact on its associated at least one fixed contact arm;

m) control means coupled to said selectively positionable operating means to apply a signal to said selectively positionable operating means to cause said selectively positionable operating means to assume said first position and apply no signal to said selectively positionable operating means to cause said selectively positionable operating means to assume said second position;

n) means for detecting a ground fault mounted on said rear side of said printed circuit board, said means for detecting a ground fault positioned adjacent phase and neutral supply line conductors frown a source of electrical power and phase and neutral load conductors to an electrical load, said means for detecting a ground fault coupled to said control means to cause a signal to be applied to said selectively positionable operating means when no fault is detected and removing said signal when a fault is detected; and o) fastening means to engage said first and second housing portions and selectively form a unitary housing therefrom; said first and third semi-circular electrical cord entrances forming a complete circular electrical cord entrance to receive one of said supply line conductors and load conductors; said second and fourth semi-circular electrical cord entrances forming a complete circular electrical cord entrance to receive the other one of said supply line conductors and load conductors: said component support means engaging said selectively positionable operating means to help maintain its desired position within said unitary housing; one of said phase and neutral supply line conductors coupled to said at least one movable contact arm and the equivalent one of said phase and neutral load conductors coupled to the associated one of said at least one fixed conductor arms whereby said one of said phase and neutral supply line conductors is continuous with said equivalent one of said phase and neutral load conductors in the absence of a fault.

2. An in-line cord ground fault circuit interrupter as defined in claim 1, further comprising reset means mounted on said first housing portion and when operated causing said control means to apply said signal to said selectively positionable operating means to move said selectively positionable operating means to said first position.

3. An in-line cord ground fault circuit interrupter as defined in claim 1, further comprising test means mounted on said first housing portion and when operated causing said control means to not apply said signal to said selectively positionable operating means to move said selectively positionable operating means to said second position.

4. An in-line cord ground fault circuit interrupter as defined in claim 1, further comprising:

a. said printed circuit board containing the components of said means for detecting a ground fault;

b. each of said at least one movable contact arm has a first and a second end;

c. a contact pad, one for each of said at least one movable contact arm, adjacent said first end of each of said at least one movable contact arm and each of said at least one movable contact arm is coupled to said front side of said printed circuit board at said at least one movable contact arm second end.

5. An in-line cord ground fault circuit interrupter as defined in claim 1, further comprising:

a. said printed circuit board containing the components of said means for detecting a ground fault;

b. each of said at least one fixed contact arm has a first end a second end;

c. a contact pad, one for each of said at least one fixed contact arm, adjacent said first end of each of said at least one fixed contact arm and each said at least one fixed contact arm is coupled to said rear side of said printed circuit board at said at least one fixed contact arm second end.

6. An in-line cord ground fault circuit interrupter as defined in claim 1, further comprising:
   a. said printed circuit board containing the components of said means for detecting a ground fault;
   b. each of said at least one movable contact arm has a first and a second end;
   c. a first contact pad, one for each of said at least one movable contact arm, adjacent said first end of each of said at least one movable contact arm and each said at least one movable contact arm is coupled to said front side of said printed circuit board at said at least one movable contact arm second end;
   d. each of said at least one fixed contact arm has a first end and a second end; and
   e. a second contact pad, one for each of said at least one fixed contact arm, adjacent said first end of each of said at least one fixed contact arm and each said at least one fixed contact arm is coupled to said rear side of said printed circuit board at said at least one fixed contact arm second end.

7. An in-line cord ground fault circuit interrupter as defined in claim 1, wherein there are two movable contacts and two fixed contacts.

8. An in-line cord ground fault circuit interrupter as defined in claim 1, wherein said selectively positionable operating means comprises:
   a. relay coil having a magnetizable core which is magnetized when a signal is applied to said relay coil by said control means;
   b. a central plate pivotally coupled adjacent said magnetizable core which is attracted to said magnetizable core when said magnetizable core is magnetized by the application to said coil of said signal;
   c. two arms extending from said central plate in opposite directions along a common axis; and
   d. a pad of insulating material on each of said two arms and positioned in line with an associated one of said movable and fixed contacts, whereby when said selectively positionable operating means is positioned in said first position, each of said pads of insulating material on said arms engages its associated at least one movable contact arm and moves said at least one movable contact arm and contact into engagement with its associated one of said at least one fixed contact and holds said at least one movable and said at least one fixed contacts in such position.

9. An in-line cord ground fault circuit interrupter as defined in claim 1, wherein there are two fixed contact arms and two movable contact arms.

10. An in-line cord ground fault circuit interrupter as defined in claim 1, wherein said means for detecting a ground fault comprises at least one toroidal transformer through which conductors coupled to said supply line conductors pass.

11. An in-line cord ground fault circuit interrupter as defined in claim 10, wherein said means for detecting a ground fault comprises two toroidal transformers, one of which is a differential transformer through which conductors coupled to said supply line conductors pass.

12. An in-line cord ground fault circuit interrupter as defined in claim 11, wherein said differential transformer monitors the flow of current in said supply line conductors and said second transformer monitors a fault between one of said supply line conductors and ground.

13. An in-line cord ground fault circuit interrupter as defined in claim 12, wherein one of said supply line conductors is neutral and the other is the phase conductor and said differential transformer monitors the flow of current in said neutral and phase conductors and fails to produce said signal when the total current in the phase conductor does not equal the current in said neutral conductor; and said second transformer monitors a fault between said neutral conductor and ground and fails to produce said signal when a fault exists.

* * * * *